(12) United States Patent
Li et al.

(10) Patent No.: US 6,857,635 B1
(45) Date of Patent: Feb. 22, 2005

(54) ULTRA HIGH VACUUM FERROFLUIDIC SEALS AND METHOD OF MANUFACTURE

(75) Inventors: Zhixin Li, Hudson, NH (US); Andrew Schreiber, Ashby, MA (US); Jurgen Zinsstag, Nashua, NH (US)

(73) Assignee: FerroTec (USA) Corporation, Nashua, NH (US)

( * ) Notice: Subject to any disclaimer, the term of this patent is extended or adjusted under 35 U.S.C. 154(b) by 0 days.

(21) Appl. No.: 10/274,179

(22) Filed: Oct. 18, 2002

Related U.S. Application Data (60) Provisional application No. 60/330,197, filed on Oct. 18, 2001.

(51) Int. Cl.[7] .............................................. F16J 15/43
(52) U.S. Cl. ...................................... 277/410; 277/649
(58) Field of Search .............................. 277/410, 649, 277/644, 615, 630, 637

(56) References Cited

U.S. PATENT DOCUMENTS

| | | | | |
|---|---|---|---|---|
| 2,996,162 A | * | 8/1961 | Lehde | 192/21.5 |
| 4,054,293 A | * | 10/1977 | Hoeg et al. | 277/410 |
| 4,200,296 A | * | 4/1980 | Stahl et al. | 277/302 |
| 4,335,885 A | * | 6/1982 | Heshmat | 277/347 |
| 4,482,129 A | * | 11/1984 | Baker et al. | 251/334 |
| 4,575,102 A | * | 3/1986 | Raj et al. | 277/410 |
| 4,577,340 A | * | 3/1986 | Carlson et al. | 378/132 |
| 4,605,233 A | * | 8/1986 | Sato | 277/410 |
| 4,865,334 A | * | 9/1989 | Raj et al. | 277/410 |
| 4,988,130 A | * | 1/1991 | Obara et al. | 285/328 |
| 5,007,513 A | * | 4/1991 | Carlson | 192/21.5 |
| 5,113,102 A | * | 5/1992 | Gilmore | 310/88 |
| 5,238,254 A | * | 8/1993 | Takii et al. | 277/347 |
| 5,433,454 A | * | 7/1995 | Ramberg | 277/643 |
| 5,593,164 A | * | 1/1997 | Mraz et al. | 277/410 |
| 5,683,523 A | * | 11/1997 | Nakanose et al. | 148/317 |
| 5,686,941 A | * | 11/1997 | Kojima | 277/347 |
| 5,836,568 A | * | 11/1998 | Ishigaki et al. | 251/148 |
| 5,836,623 A | * | 11/1998 | Bothell et al. | 285/148.9 |

* cited by examiner

*Primary Examiner*—Alison K. Packard
(74) *Attorney, Agent, or Firm*—Robert R. Deleault, Esq.; Mesner & Deleault, PLLC

(57) ABSTRACT

A ferrofluid seal incorporates a metal seal comprised of two knife-edges and a flat metal washer is formed between a pole piece and the housing at the axial interface between the parts. One knife edge is machined into the inner face of the housing flange and the other knife edge is machined into the opposing pole piece face. This metal seal effectively seals the pole piece to the housing with a seal suitable for ultra high vacuum applications.

29 Claims, 10 Drawing Sheets

ULTRA HIGH VACUUM FERROFLUIDIC SEALS AND METHOD OF MANUFACTURE

RELATED APPLICATIONS

This application is related to, and claims priority of, U.S. provisional application No. 60/330,197, entitled ULTRA HIGH VACUUM FERROFLUIDIC SEALS, filed on Oct. 18, 2001 by Zhixin Li, Andrew Schreiber and Jurgen Zinsstag

FIELD OF THE INVENTION

This invention relates to ferrofluidic seals for use in an ultra high vacuum environment.

BACKGROUND OF THE INVENTION

Figure 1:
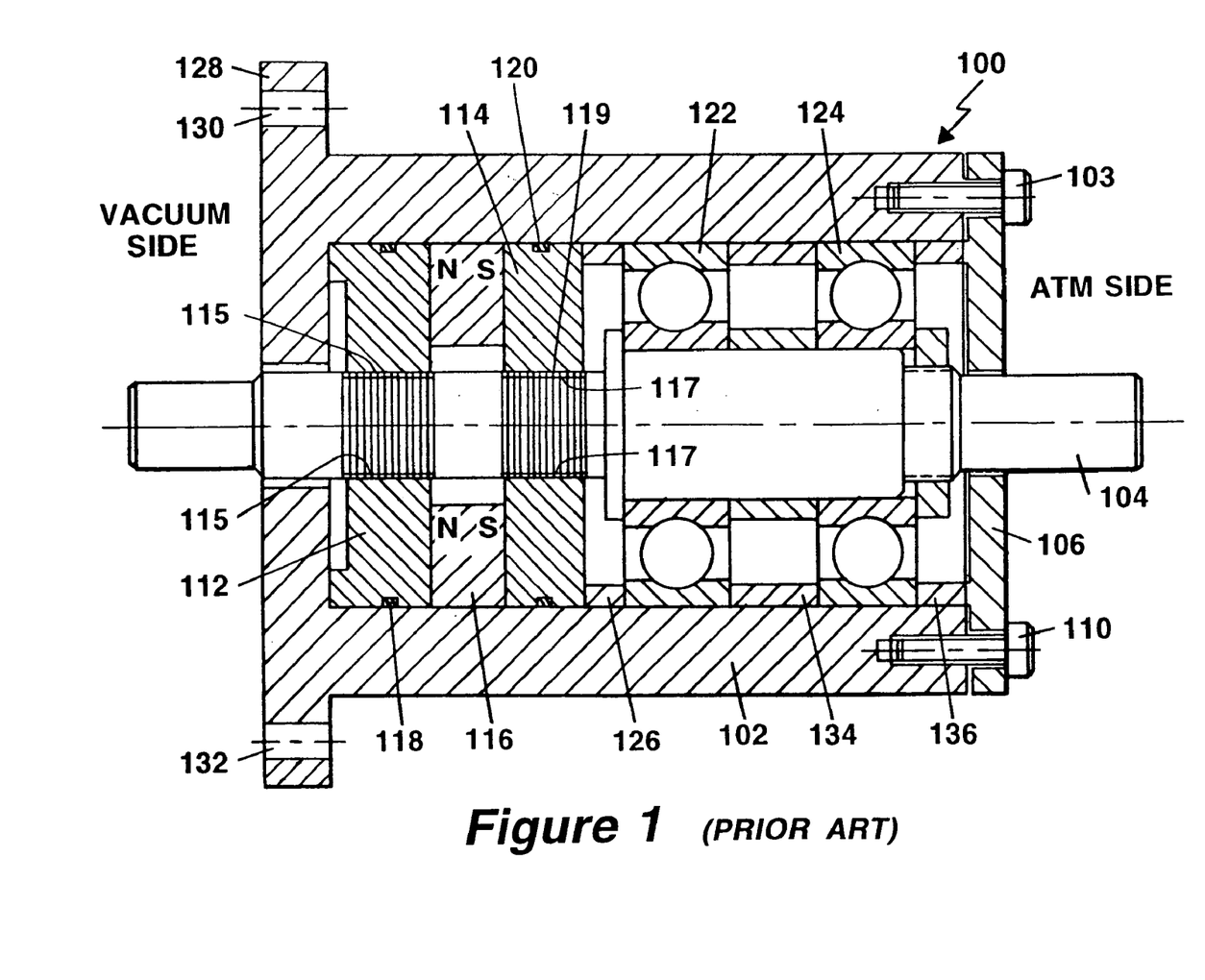
FIG. 1 is a partial cross-sectional diagram that illustrates a prior art ferrofluid rotary seal that uses conventional O-ring seals between the ferrofluid seal pole pieces and the housing.

Ferrofluidic rotary seals have been widely used in vacuum applications over the past 20 years. The basic structure of a conventional ferrofluid seal is illustrated in FIG. 1, which is a partial cross-sectional view of an axially symmetric seal. The seal 100 comprises a non-magnetic housing 102 through which a magnetically permeable rotary shaft passes 104. The housing 102 is closed by a non-magnetic end cap 106 that is fastened to the housing 102 by a plurality of clamping screws of which screws 103 and 110 are shown. A pair of ferrofluid seals is formed of an outer annular pole piece 112 fabricated of magnetically permeable material and an inner annular pole piece 114 also fabricated of magnetically permeable material. Pole pieces 112 and 114 are separated by an axially-polarized toroidal magnet 116. The magnet 116, the poles 112, 114 and the shaft 104 form magnetic circuits with one or more air gaps between the inner surfaces 115 and 117 of the poles 112, 114, respectively and the shaft 104. As shown in FIG. 1, the shaft may be machined to form rings or teeth near the pole pieces 122, 144. Ferrofluid 119 is attracted to each air gap and, is well known, forms dynamic O-ring seals between the pole 112 and the rotary shaft 104 and the pole 114 and the rotary shaft 104. The ferrofluid used in these seals is typically a colloidal dispersion of magnetic particles covered with a surfactant and suspended in a liquid carrier fluid such as oil. A seat is formed between the pole pieces 112, 144 and the housing 102 by rubber O-rings 118, 120, respectively at the radial interface between the parts.

The seal embodiment shown in FIG. 1 also includes bearings 122, 124 that are also located inside the housing 102. Bearing 122 is separated from pole piece 114 by an annular spacer 126. Similarly, bearings 122 and 124 are separated from each other by annular spacer 134 and from end cap 106 by annular spacer 136.

The seal 100 can be attached to a vacuum chamber (not shown) by bolts (not shown) that pass through holes 130 and 132 located in a flange 128 that is integral with the housing 102.

Seals with the above structure have been effective for a variety of applications, such as semi-conductor manufacturing, optical coating, rotary gas unions, etc. However, in recent years, an increased number of applications require an ultra-high vacuum (UHV) environment. To achieve an ultra-high vacuum environment, the gas load, or the total leakage/permeation through seals plus gas evaporated inside the vacuum chamber, has to be minimized. The aforementioned rubber O-ring seals 118 and 120 typically have relatively high gas permeation rates (between $10^{-4}$ and $10^{-7}$ std cc/sec) and thus are not suitable for UHV applications. In addition, rubber O-rings, such as O-rings 118 and 120 typically have operational temperature limits less than 200° C., and, therefore, are unable to survive the high temperature baking procedure commonly used in UHV process to complete outgassing of the vacuum chamber.

It is possible to achieve a high-quality static seal between the pole pieces 112 and 114 and the housing 102 by welding the pieces together. However, welded joints frequently cause difficulties in manufacturing, assembly, and maintenance of the seals.

SUMMARY OF THE INVENTION

In accordance with the principles of the invention, a metal seal comprised of two knife-edges and a flat metal washer is formed between a pole piece and the housing at the axial interface between the parts. One knife-edge is machined into the inner face of the integral housing flange and the other knife-edge is machined into the opposing pole piece face. This metal seal effectively seals the pole piece to the housing with a seal suitable for ultra high vacuum applications.

In one embodiment, the knife-edges are circular and have the same diameter. A metal flat washer, typically made of copper, is placed in between the two knife-edges. The force applied to the pole piece from tightening the clamping bolts that mount the end cap to the housing forces the knife-edges into the flat washer and forms a hermetic seal.

In another embodiment, the attachment flange that is used to attach the seal to a vacuum chamber is separate from the seal housing. The seal housing is attached to the flange by clamping screws. A force is applied to the pole piece by a shoulder in the housing when the clamping screws between the housing and attachment flange are tightened. This force causes the knife-edges to be forced into the flat washer and to form a hermetic seal.

In still another embodiment, the outer pole piece is eliminated and a ferrofluid seal is formed between an attachment flange that is integral with the seal housing and the shaft that passes through the flange.

BRIEF DESCRIPTION OF THE DRAWINGS

The above and further advantages of the invention may be better understood by referring to the following description in conjunction with the accompanying drawings in which.

DETAILED DESCRIPTION

Figure 2:
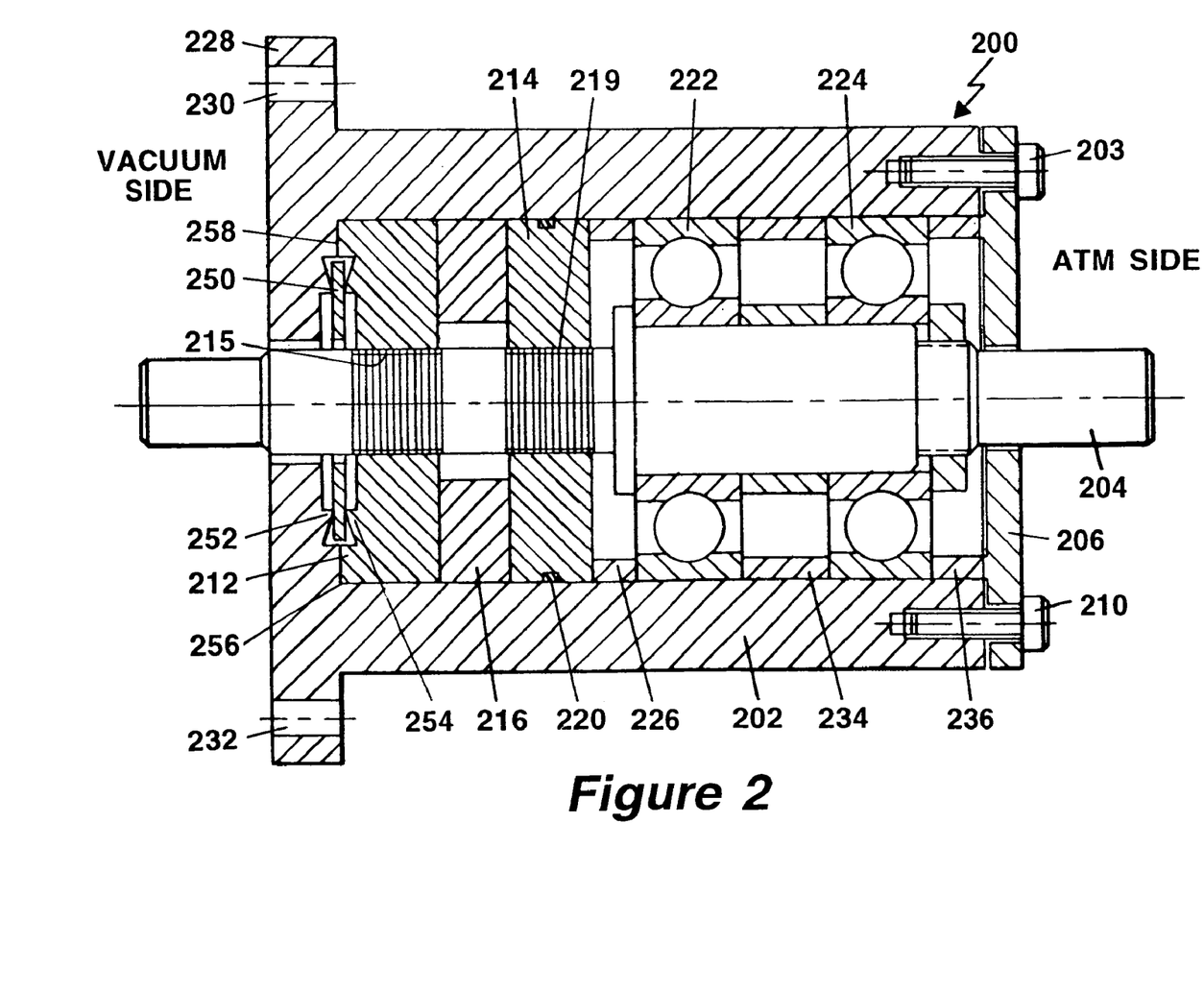
FIG. 2 is a partial cross-sectional diagram that illustrates a ferrofluid seal constructed in accordance with the principles of the invention in which a knife-edged metal seal is located between the outer seal pole piece and the seal housing. The inner pole piece uses a conventional O-ring seal.

In one embodiment, a metal seal comprised of two knife-edges and a flat metal washer is formed between the outer pole piece 212 and the housing 202 at the axial interface 256 as shown in FIG. 2. In FIG. 2, elements that correspond with similar elements in FIG. 1 have been given corresponding numeral designations. For example, housing 102 in FIG. 1 corresponds to housing 202 in FIG. 2. One knife edge 252 is machined into the inner face 258 of the integral housing flange 228 and the other circular knife edge 254 is machined into the opposing face of the outer pole piece 212. In one embodiment, the knife edges 252 and 254 are circular with the same diameter. The knife edges 252 and 254 could also have other configurations as long as they have a closed circumference. A metal flat washer 250, typically made of copper, is placed in between the two knife-edges 252 and 254. The force generated by tightening the clamping screws of which two 203 and 210 are shown that mount the end cap 206 to the housing 202 forces the knife-edges 252 and 254 into the flat washer 250 to form a hermetic seal. This force is transmitted from the end cap 206 through the bearings 222 and 224 and spacers 226, 234 and 236, the inner pole piece 214 and the magnet 216 to the outer pole piece 212. In the embodiment shown in FIG. 2, a conventional rubber O-ring 220 seals the inner pole piece 214 to the housing 292. Ferrofluid seals are formed between both pole pieces 212 and 214 and the rotating shaft 204. An external seal between the ferrofluidic seal unit 200 and the vacuum chamber (not shown) can be formed by any suitable type of sealing mechanism, such as (metal) O-rings, Conflat seals, gaskets, etc. located between the integral flange 229 and the vacuum chamber.

The metal seal formed by knife-edges 252 and 254 and metal washer 250 greatly improves the performance of ferrofluidic seals in ultra high vacuum applications and leads to a significantly improved product. In particular, the knife-edged metal seal has a much lower gas permeation rate compared with rubber O-ring seals. In addition, the metal seal can sustain much higher temperature compared with rubber O-ring seals.

Figure 3:
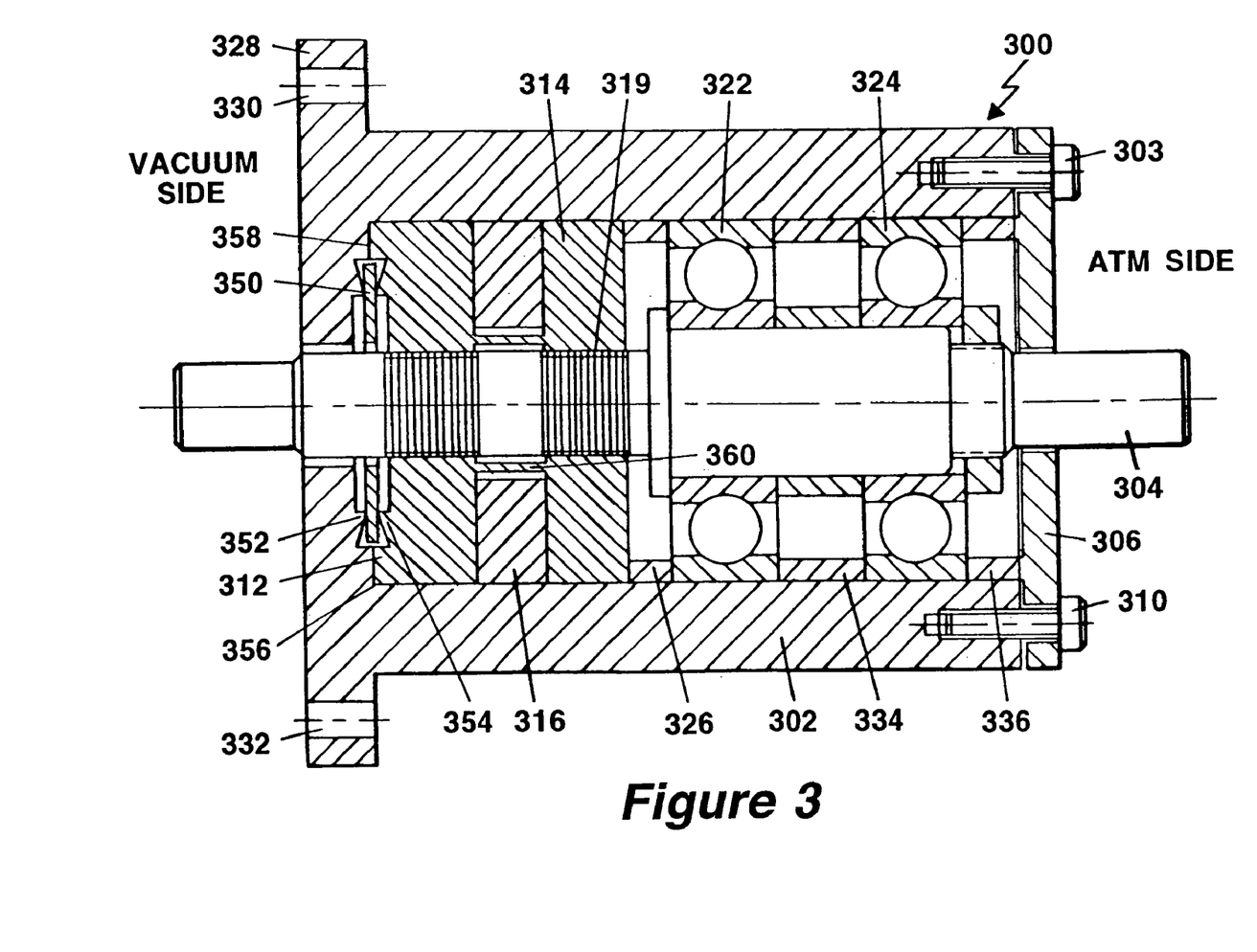
FIG. 3 is a partial cross-sectional diagram that illustrates a ferrofluid seal constructed in accordance with the principles of the invention in which a knife-edged metal seal is located between the outer seal pole piece and the seal housing and the pole pieces that comprise the ferrofluid seal are connected by a hermetic bridge.

This invention can have many embodiments. For example, in the embodiment shown in FIG. 3, the pole pieces 312 and 314 and can be formed as a single unit with an annular slot cut into the unit to accept the magnet 316. In FIG. 3, elements that correspond with similar elements in FIGS. 1 and 2 have been given corresponding numeral designations. For example, housing 302 in FIG. 3 corresponds to housing 202 in FIG. 2 and housing 102 in FIG. 1. This construction results in a thin, annular hermetic bridge 360 extending between the poles 312 and 314 as shown in FIG. 3. This hermetic bridge allows the O-ring 220 shown in FIG. 2 to be eliminated.

Figure 4:
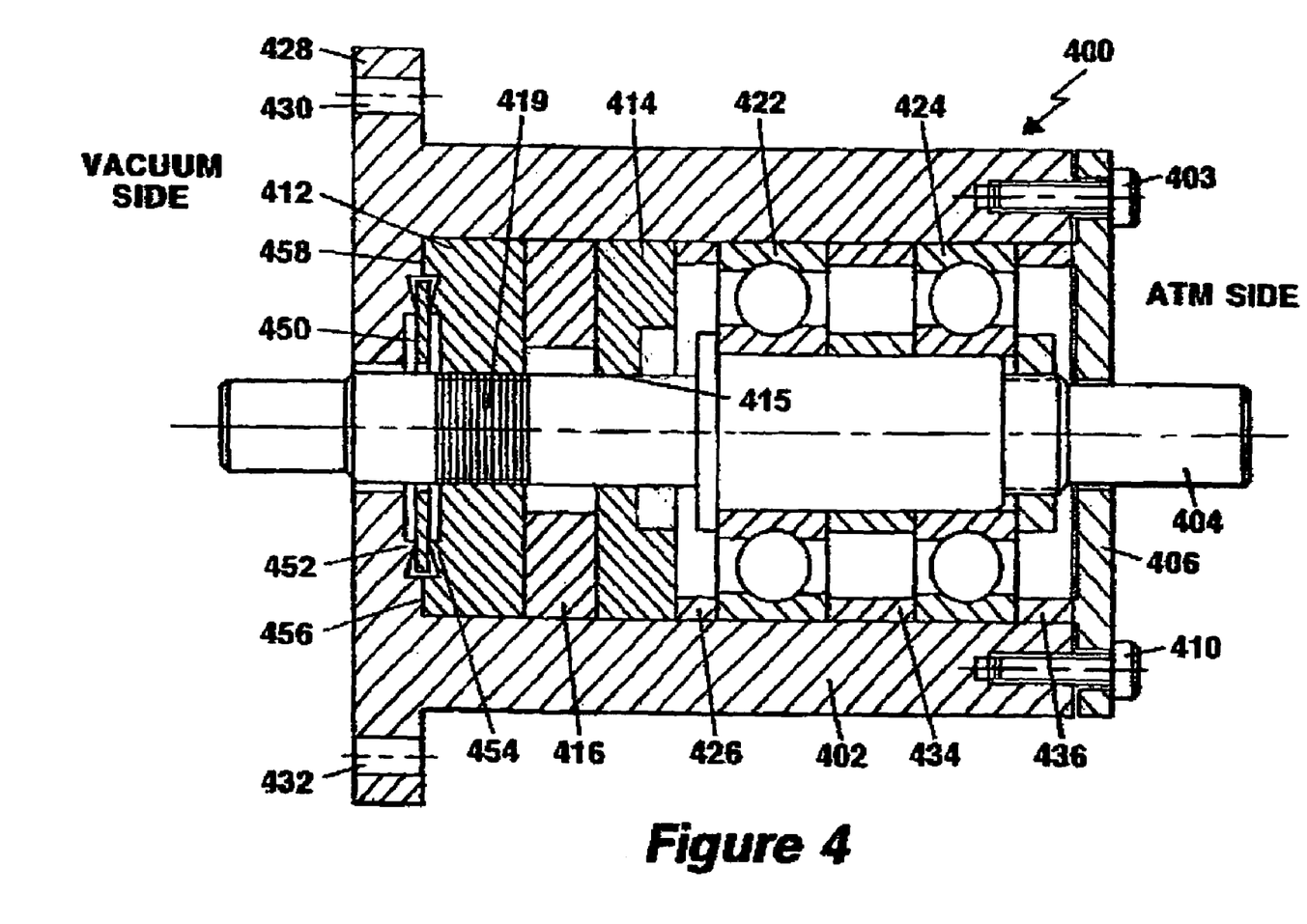
FIG. 4 is a partial cross-sectional diagram that illustrates a ferrofluid seal constructed in accordance with the principles of the invention in which a knife-edged metal seal is located between the outer seal pole piece and the seal housing and the one of the pole pieces that comprise the ferrofluid seal is a shunt pole piece.

Seals constructed in accordance with the principles of the invention can also use various ferrofluid seal designs. For example, in another embodiment shown in FIG. 4, a single ferrofluid seal is formed between the outer pole piece 412 and the shaft 404 as in the previous figures, in FIG. 4, elements that correspond with similar elements in FIGS. 1-3 have been given corresponding numeral designations. In this seal design, the inner pole piece 414 forms a small gap 415 with the shaft 404. However, this gap does not contain ferrofluid and does not form a seal. Instead, the pole piece 414 acts as a shunt to complete the magnetic circuit that passes through the ferrofluid 410, pole piece 412, the magnet 416, pole piece 414, the gap 415, the shaft 402 and back through gap 415, pole piece 414, magnet 416, pole piece 412 and ferrofluid 419.

Figure 5:
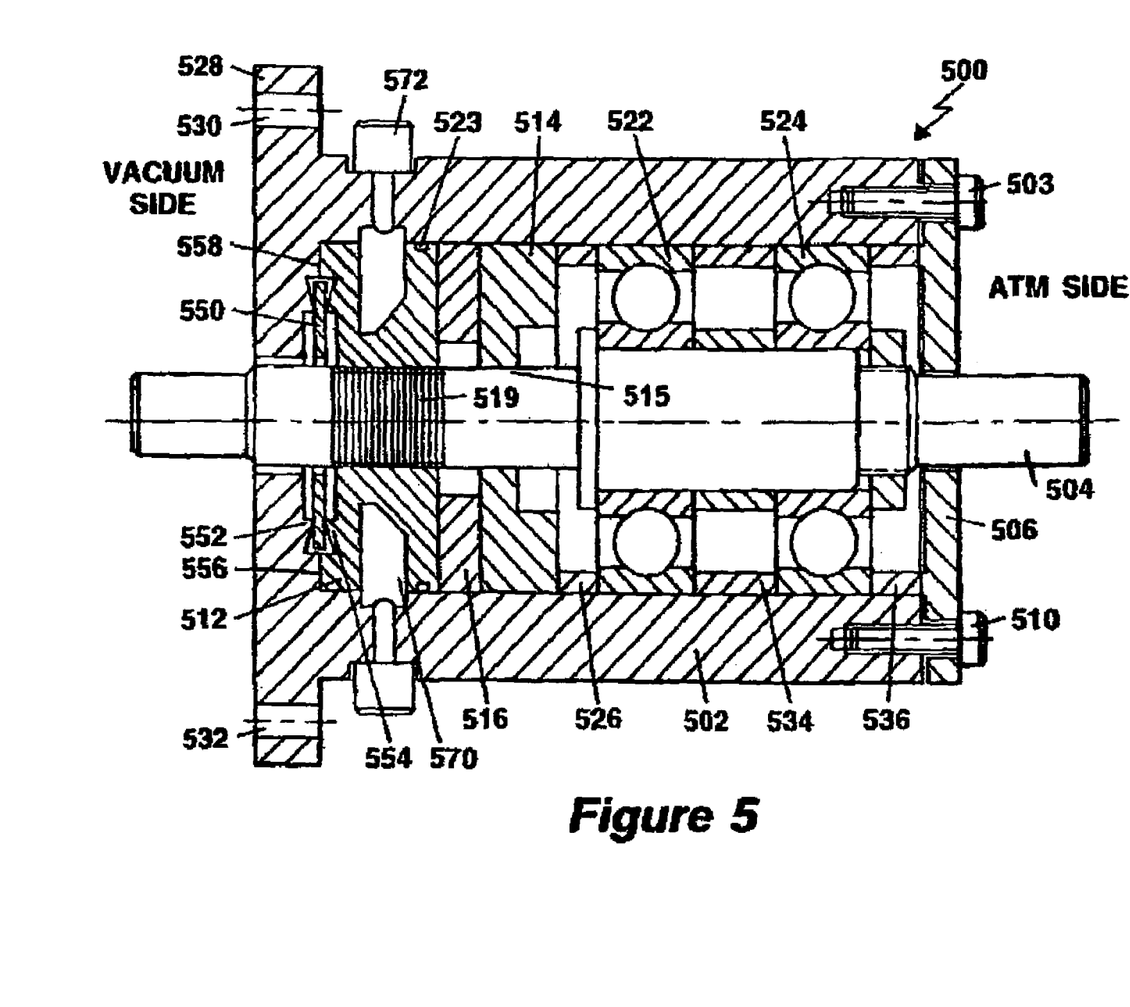
FIG. 5 is a partial cross-sectional diagram that illustrates a ferrofluid seal constructed in accordance with the principles of the invention in which a knife-edged metal seal is located between the outer seal pole piece and the seal housing and the one of the pole pieces that comprise the ferrofluid seal has a water channel in it.

In addition, in other embodiments, such as that illustrated in FIG. 5, water-cooling chambers can be incorporated to cool the ferrofluid seal. In FIG. 5, elements that correspond with similar elements in FIGS. 1-4 have been given corresponding numeral designations. In this embodiment, the outer pole piece 512 has been enlarged to accommodate a water cooling channel 570 and a water channel access fitting 572. In addition, a rubber O-ring 523 has been included to seal the outer 30 circumference of the outer pole piece 512 to the housing 502 to prevent coolant leakage into the interior of the seal mechanism. In this embodiment, a single ferrofluid seal is also formed between the outer pole piece 512 and the shaft 502 with the inner pole piece 514 forming a small gap 515 with the shaft 502 and acting as a shunt to complete a magnetic circuit in a manner similar to that described in connection with FIG. 4.

Figure 6:
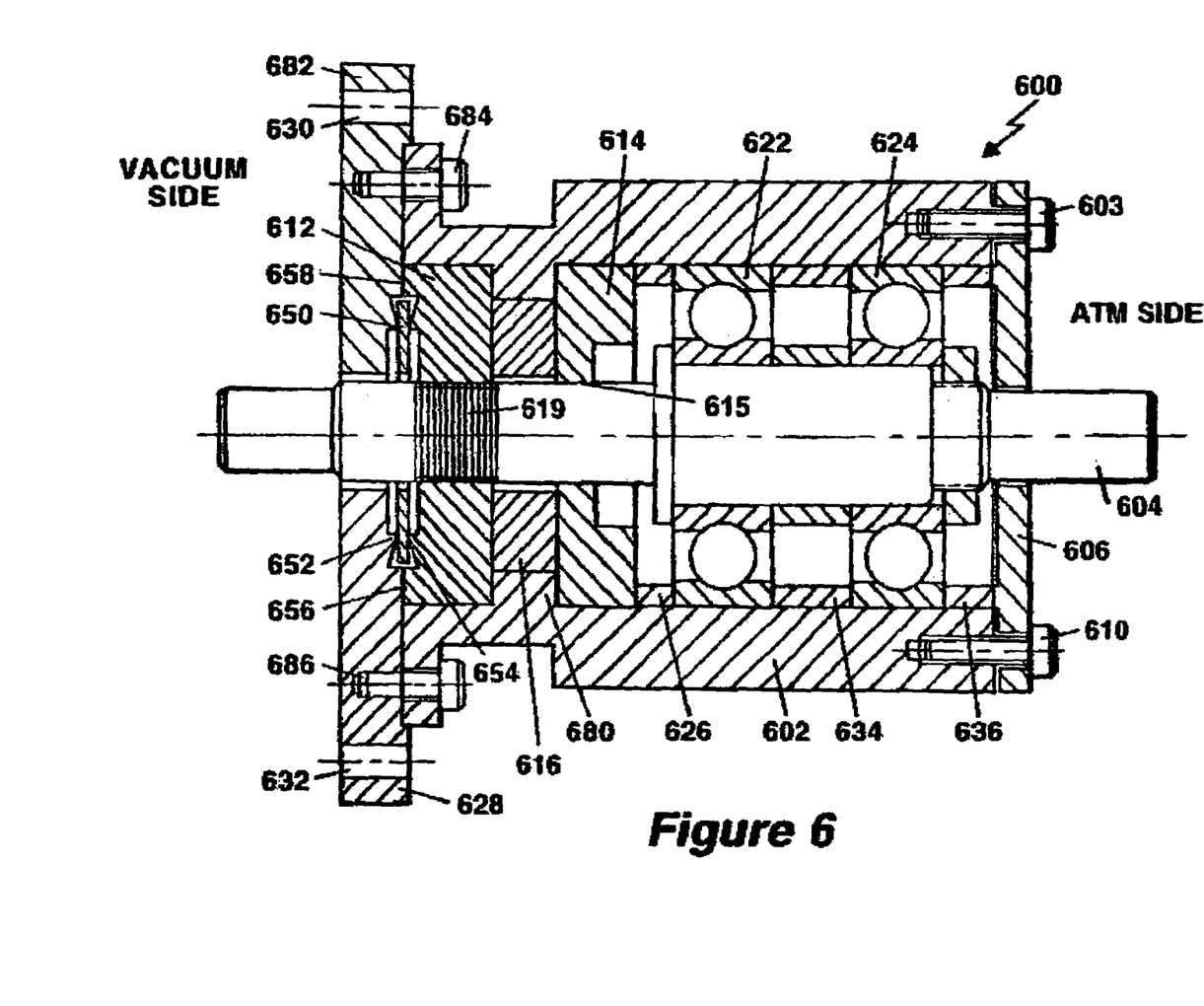
FIG. 6 is a partial cross-sectional diagram that illustrates a ferrofluid seal constructed in accordance with the principles of the invention in which a knife-edged metal seal is located between the outer seal pole piece and a separate attachment flange and wherein the housing has an internal step to create a force on the pole piece that forms the knife-edge seal.

In another example, shown in FIG. 6, attachment flange 628 is separate from the housing 602. In FIG. 6, elements that correspond with similar elements in FIGS. 1-5 have been given corresponding numeral designations. In this embodiment, an internal step 680 is formed inside the housing 602 between the inner pole piece 614 and the outer pole piece 612. Step 680 bears against the outer pole piece 614 so that pressure to force the knife edges 652 and 654 into the washer 650 can be applied by the clamping screws (of which screws 684 and 6886 are shown) that attach the housing 602 to the separate attachment flange 628. Thus, pressure does not have to be applied via the internal components of the seal (bearings 622 and 624, spacers 626, 634 and 636, pole piece 614 and magnet 616) from the and cap 606 and clamping screws 603 and 610. In this embodiment also, a single ferrofluid seal is also formed between the outer pole piece 612 and the shaft 604 with the inner pole piece 614 forming a small gap 615 with the shaft 604 and acting as a magnetic shunt to complete a magnetic circuit as described in connection with FIG. 4.

Figure 7:
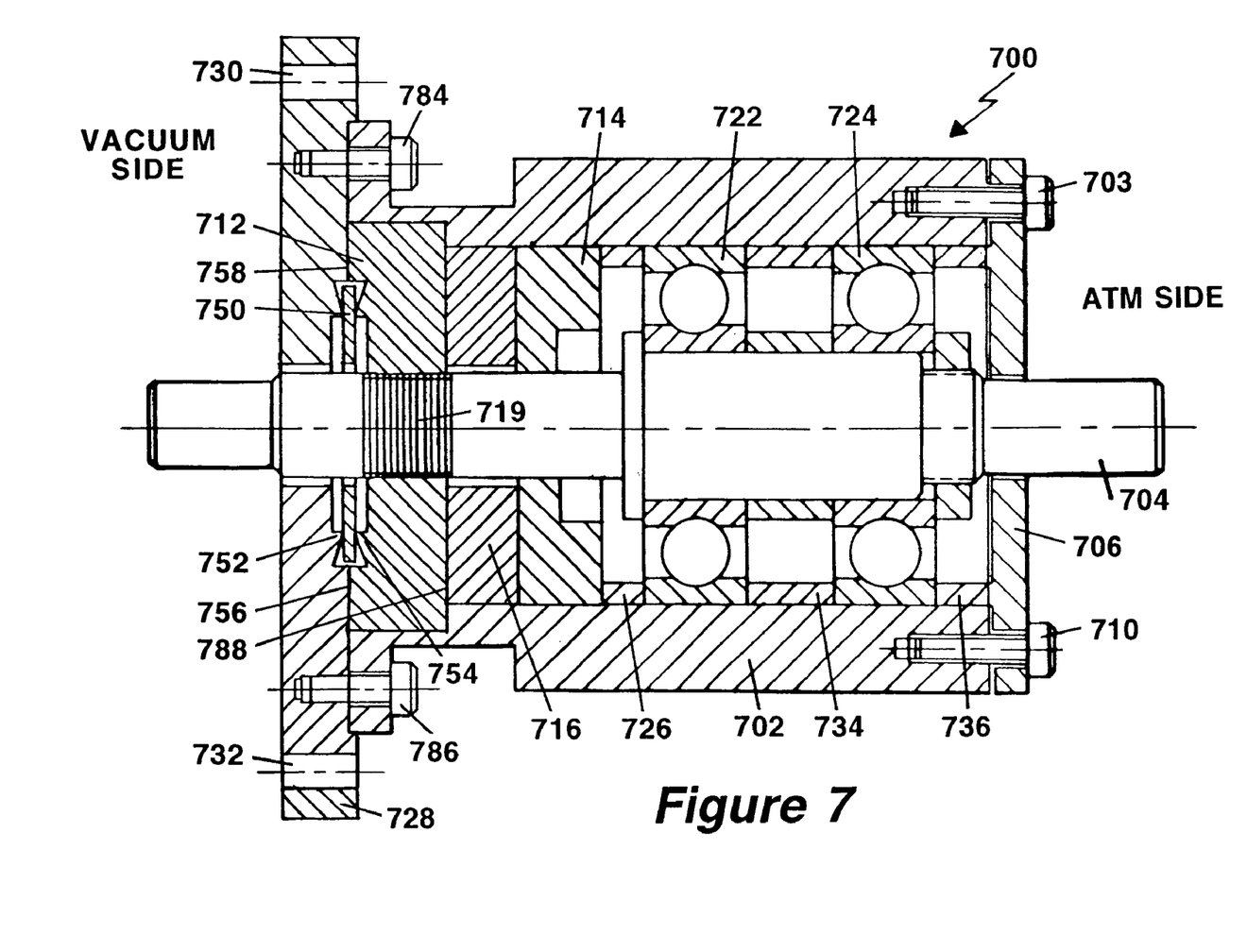
FIG. 7 is a partial cross-sectional diagram that illustrates a ferrofluid seal constructed in accordance with the principles of the invention in which a knife-edged metal seal is located between the outer seal pole piece and a separate attachment flange and wherein the housing has an internal shoulder to create a force on the pole piece that forms the knife-edge seal.

In another example, shown in FIG. 7 in which elements that correspond with similar elements in FIGS. 1-6 have been given corresponding numeral designations, the attachment flange 728 is also separate from the housing 702, and an internal shoulder 788 is formed inside the housing 702 so that pressure to force the knife edges 752 and 754 into the washer 750 can be applied by clamping screws 784 and 786 which attach the housing 702 to the attachment flange 728. This arrangement allows the housing 702 inner diameter to be machined from one side and provides more space for the magnet 716. As with the previous embodiments, a single ferrofluid seal is also formed between the outer pole piece and the shaft with the inner pole piece forming a small gap with the shaft and acting as a shunt to complete the magnetic circuit.

Figure 8:
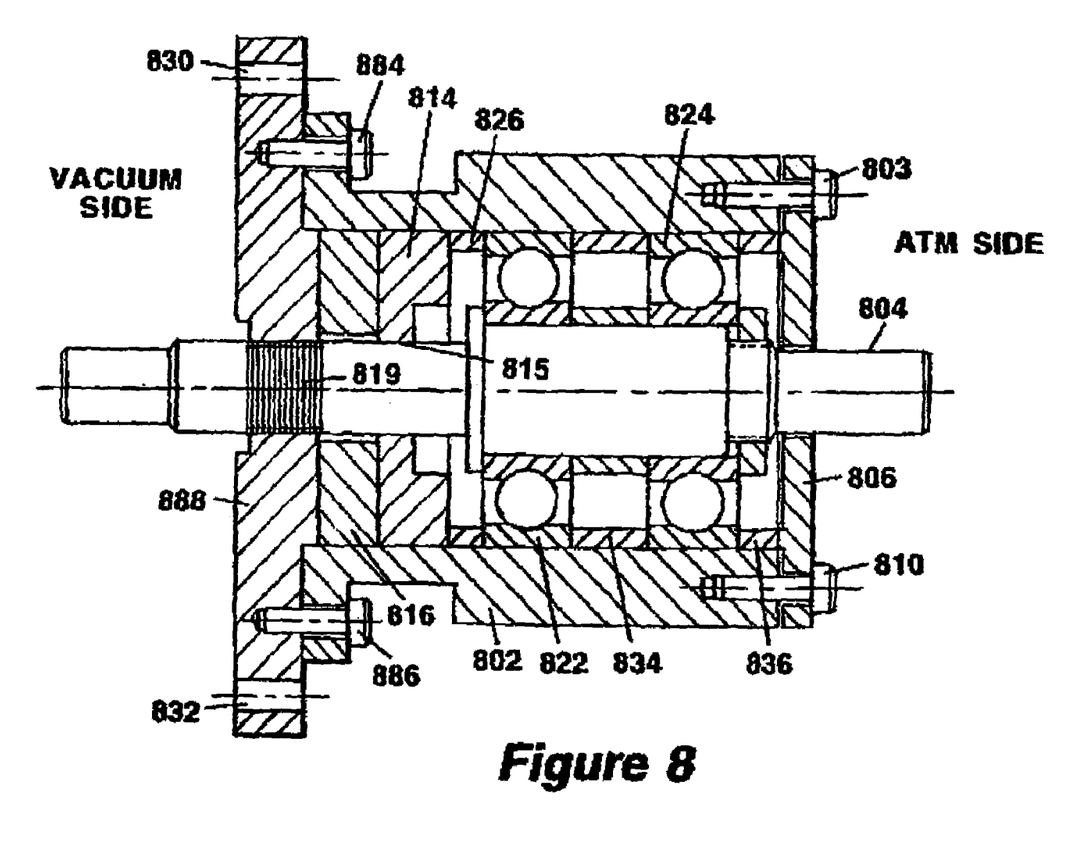
FIG. 8 is a partial cross-sectional diagram that illustrates a ferrofluid seal constructed in accordance with the principles of the invention in which the ferrofluid seal is located in the attachment flange that attaches the seal unit to a vacuum chamber.

In still another example, shown in FIG. 8 in which elements that correspond with similar elements in FIGS. 1-7 have been given corresponding numeral designations, the attachment flange 888 is also separate from the housing 802. However, in this example, the attachment flange extends close to the rotating shaft so that a single ferrofluid seal is formed between the rotating shaft 804 and the attachment flange 888 that also acts as the outer pole piece. As with the previous embodiments, the inner pole piece 814 forms a small gap 815 with the shaft 804 and acts as a magnetic shunt to complete a magnetic circuit as described in connection with FIG. 4.

Figure 9:
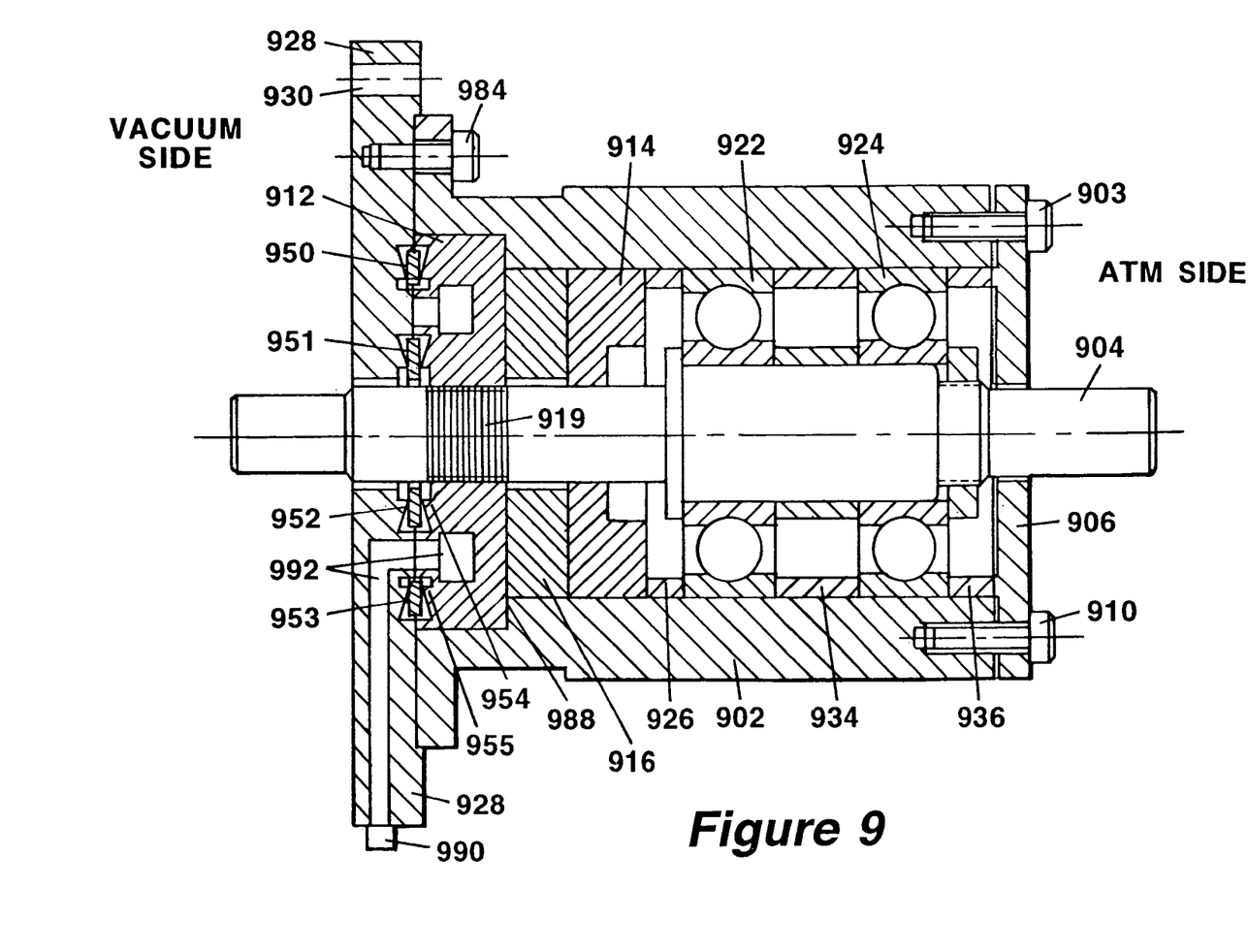
FIG. 9 is a partial cross-sectional diagram that illustrates a ferrofluid seal constructed in accordance with the principles of the invention in which two knife-edged metal seals are located between the outer seal pole piece and the seal housing in order to form a water channel therebetween.

Multiple knife-edge seals can be used. In FIG. 9 in which elements that correspond with similar elements in FIGS. 1-8 have been given corresponding numeral designations, the outer pole piece 912 has been machined to incorporate a coolant channel 992 that is connected to a coolant supply by a coolant access pipe 994 that is fabricated in the attachment flange 928 and a fitting 990. Knife-edge seals are used in two places between the outer pole piece 912 and the attachment flange 928 in order to both seal the unit and prevent coolant leakage. The first knife-edge seal is comprised of knife edges 952 and 954 and metal washer 950. The second knife-edge seal is comprised of knife edges 953 and 955 and metal washer 951. The embodiment shown in FIG. 9 also has an internal shoulder 988 formed inside the housing 902 so that pressure to force the knife edges 952-955 into the washers 950 and 951 can be applied by clamping screws (of which screw 984 is shown in FIG. 9) that attach the housing 902 to the attachment flange 928.

Figure 10:
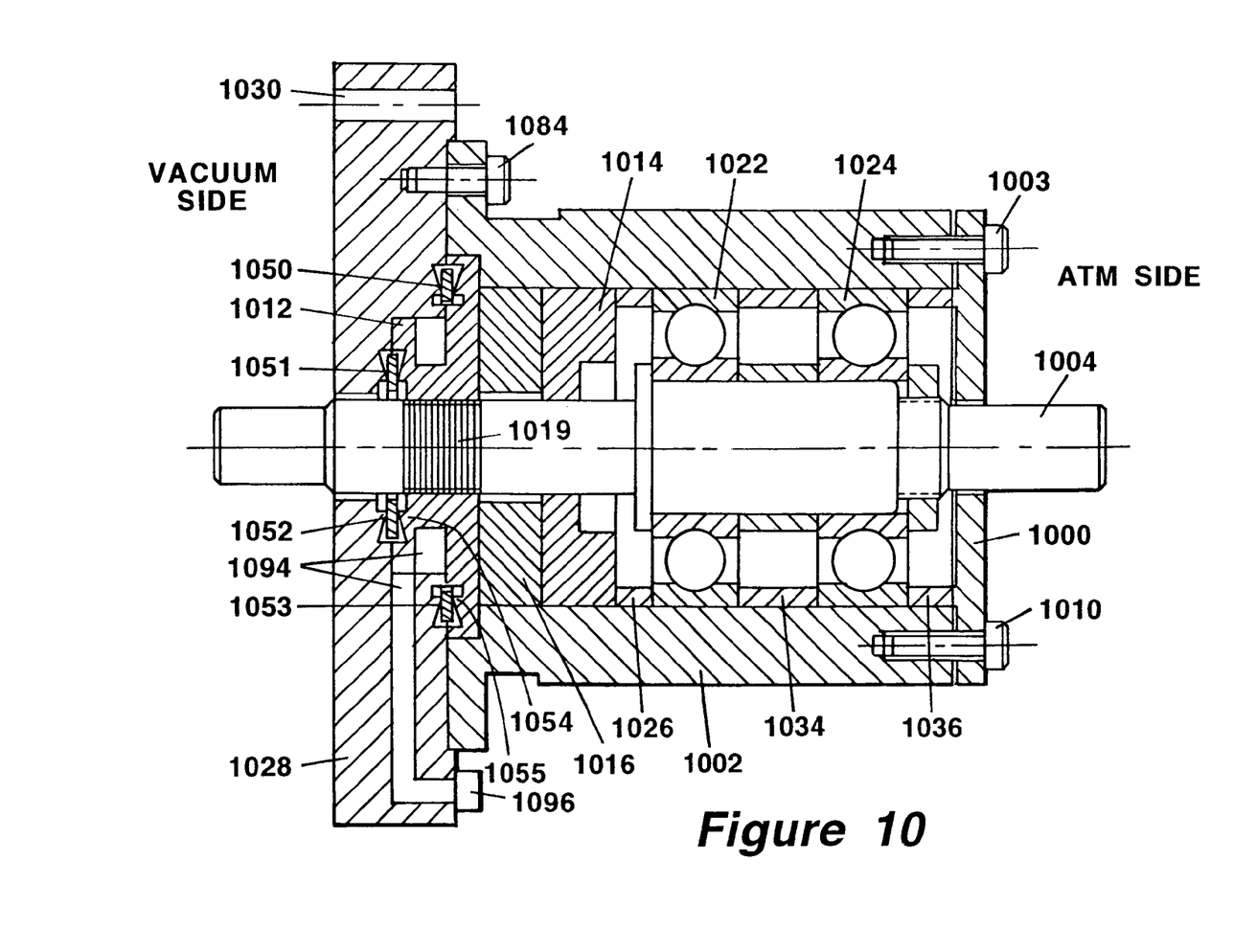
FIG. 10 is a partial cross-sectional diagram that illustrates a ferrofluid seal constructed in accordance with the principles of the invention in which two knife-edged metal seals are located between the outer seal pole piece and the seal housing in order to form a water channel therebetween.

A similar arrangement is shown in FIG. 10 in which elements that correspond with similar elements in FIGS. 1-8 have been given corresponding numeral designations. In this embodiment, the outer pole piece 1012 has a T-shaped cross section. A coolant channel 1092 is formed as an annular ring cut into the outer pole piece 1012. The coolant channel 1092 is connected to a coolant supply by a coolant access pipe 1094 that is fabricated in the attachment flange 1028. The coolant access pipe 1094 is also provided with a fitting 1090. Two knife-edge seals are used at different positions to both seal the unit and prevent coolant leakage. The first knife-edge seal comprises knife-edges 1052 and 1054 and metal washer 1050. The second knife-edge seal comprises knife-edges 1053 and 1055 and metal washer 1051.

The constructions shown in FIGS. 9 and 10 have several important features. For example, there is no gas permeation through any static seals. In addition, the seal can be baked at high temperatures. The performance of these seal designs can be further enhanced with ceramic magnets and high temperature, low evaporation ferrofluid.

Although an exemplary embodiment of the invention has been disclosed, it will be apparent to those skilled in the art that various changes and modifications can be made which will achieve some of the advantages of the invention without departing from the spirit and scope of the invention. For example, it will be obvious to those reasonably skilled in the art that, in other implementations, different arrangements can be used for the construction of the ferrofluid seals. For example, in place of the stationary pole pieces illustrated in the examples discussed above, the pole pieces can be attached to the shaft and rotate relative to the housing, with the ferrofluid seal being formed between the pole pieces and the housing. In this construction, the knife-edged metal seal can be located between the shaft and the pole.

What is claimed is:

1. A ferrofluid seal suitable for sealing a magnetically-permeable rotating shaft passing from a first environment at a first pressure to a second environment at a second pressure higher than the first pressure, the seal comprising:
a housing having an attachment flange and a body;
a magnetically permeable annular pole piece extending close to the rotating shaft to form an air gap between the pole piece and the shaft;
a coolant channel located in the interior of the pole piece and means for conducting coolant through the coolant channel wherein the means comprises a coolant channel that passes through the attachment flange and into the pole piece;
a magnet generating a magnetic field that passes through the pole piece, the air gap and the shaft;
ferrofluid in the gap forming a liquid O-ring seal in the gap under influence of the magnetic field in the gap;
a first knife edge formed in the housing;
a second knife edge formed in the pole piece opposing the first knife edge;
a metal washer located between the first and second knife edges;
a third knife edge formed in the housing;
a fourth knife edge formed in the pole piece opposing the third knife edge;
a second metal washer located between the third and fourth knife edges; and
a mechanism for applying a force between the housing and the pole piece to force the first and second knife edges into the metal washer and the third and fourth knife edges into the second metal washer thereby forming a hermetic seal.

2. The ferrofluid seal of claim 1 further comprising a second magnetically permeable annular pole piece extending close to the rotating shaft to form a second air gap between the second pole piece and the shaft and located with respect to the magnet so that the magnet generates a magnetic field that passes through the second pole piece and the second air gap.

3. The ferrofluid seal of claim 2 further comprising ferrofluid in the second gap forming a liquid O-ring seal in the second gap under influence of the magnetic field in the second gap.

4. The ferrofluid seal of claim 2 wherein the first and second pole pieces are connected by an annular hermetic bridge located between the magnet and the shaft.

5. The ferrofluid seal of claim 1 wherein the housing has an integral flange for attaching the ferrofluid seal to a chamber in which the first environment is located and wherein the first knife edge is formed on the flange.

6. The ferrofluid seal of claim 5 wherein the housing is comprised of a body and a removable end cap and the mechanism for applying a force between the housing and the pole piece comprises clamping screws that clamp the end cap to the housing body.

7. The ferrofluid seal of claim 6 further comprising a second magnetically permeable annular pole piece extending close to the rotating shaft to form a second air gap between the pole piece and the shaft and located with respect to the magnet so that the magnet generates a magnetic field that passes through the second pole piece and the second air gap and wherein the force applied by the mechanism is applied to the first pole piece through the second pole piece.

8. The ferrofluid seal of claim 1 wherein the housing comprises a body and a separate flange for attaching the ferrofluid seal to a chamber in which the first environment is located and wherein the first knife edge is formed on the flange.

9. The ferrofluid seal of claim 8 wherein the housing has an internal step that bears against the pole piece and the mechanism for applying a force between the housing and the pole piece comprises clamping screws that clamp the housing body to the separate flange.

10. The ferrofluid seal of claim 8 wherein the housing has an internal shoulder that bears against the pole piece and the mechanism for applying a force between the housing and the pole piece comprises clamping screws that clamp the housing body to the separate flange.

11. The ferrofluid seal of claim 1 wherein the means for conducting coolant through the coolant channel comprises a coolant channel that passes through the body and into the pole piece.

12. The ferrofluid seal claim 1 wherein the coolant channel that passes through the attachment flange passes between the first and second hermetic seals.

13. The ferrofluid seal of claim 1 wherein the metal washer is fabricated from copper.

14. The ferrofluid seal of claim 1 further comprising a bearing located within the housing and supporting the rotating shaft.

15. A method of making a ferrofluid seal suitable for sealing a magnetically permeable rotating shaft passing from a first environment at a first pressure to a second environment at a second pressure higher than the first pressure, the method comprising:

(a) fabricating a housing from a non-magnetic material, the housing having an attachment flange and a body;

(b) fabricating a magnetically-permeable annular pole piece and aligning the pole piece so that it extends close to the rotating shaft to form an air gap between the pole piece and the shaft;

(c) placing a magnet next to the pole piece so that the magnet generates a magnetic field that passes through the pole piece, the air gap and the shaft;

(d) placing ferrofluid in the gap in order to form a liquid O-ring seal in the gap under influence of the magnetic field in the gap;

(e) forming a first knife edge in the housing;

(f) forming a second knife edge in the pole piece opposing the first knife edge;

(g) placing a metal washer between the first and second knife edges;

(h) fabricating a coolant channel in the interior of the pole piece;

(i) conducting coolant through the coolant channel wherein the coolant conducting step includes conducting coolant via a coolant access pipe that passes through the attachment flange and into the pole piece;

(j) forming a third knife edge in the housing;

(k) forming a fourth knife edge in the pole piece opposing the third knife edge;

(l) placing a second metal washer between the third and fourth knife edges; and (m) applying a force between the housing and the pole piece to force the first and second knife edges into the metal washer and the third and fourth knife edges into the second metal washer thereby forming a hermetic seal.

16. The method of claim 15 further comprising fabricating a second magnetically permeable annular pole piece and aligning the second pole piece to that it extends close to the rotating shaft to form a second air gap between the second pole piece and the shaft and is located with respect to the magnet so that the magnet generates a magnetic field that passes through the second pole piece and the second air gap.

17. The method of claim 16 further comprising placing ferrofluid in the second gap to form a liquid O-ring seat in the second gap under influence of the magnetic field in the second gap.

18. The method of claim 16 wherein step (b) comprises fabricating the first and second pole pieces out of a single block of material so that the first and second pole pieces are connected by an annular hermetic bridge located between the magnet and the shaft.

19. The method of claim 15 wherein the housing has an integral flange for attaching the ferrofluid seal to a chamber in which the first environment is located and wherein step (a) comprises forming the first knife edge on the flange.

20. The method of claim 19 wherein the housing is comprised of a body and a removable end cap and wherein step (m) comprises applying a force between the housing and the pole piece by tightening clamping screws that clamp the end cap to the housing body.

21. The method of claim 20 further comprising fabricating a second magnetically permeable annular pole piece and aligning the second pole piece so that it extends close to the rotating shaft to form a second air gap between the pole piece and the shaft and is located with respect to the magnet so that the magnet generates a magnetic field that passes through the second pole piece and the second air gap and wherein step (m) comprises applying a force to the first pole piece through the second pole piece.

22. The method of claim 15 wherein the housing comprises a body and a separate flange for attaching the ferrofluid seal to a chamber in which the first environment is located and wherein step (e) comprises forming the first knife edge on the flange.

23. The method of claim 22 wherein the housing has an internal step that bears against the pole piece and wherein step (m) comprises applying a force between the housing and the pole piece by tightening clamping screws that clamp the housing body to the separate flange.

24. The method of claim 22 wherein the housing has an internal shoulder that bears against the pole piece and wherein step (m) comprises applying a force between the housing and the pole piece by tightening clamping screws that clamp the housing body to the separate flange.

25. The method of claim 18 wherein step (i) comprises conducting coolant through the coolant channel via a coolant access pipe that passes through the body and into the pole piece.

26. The method of claim 15 wherein step (i) comprises conducting coolant through the coolant channel via a coolant access pipe that passes through the attachment flange passes between the first and second hermetic seals.

27. The method of claim 15 further comprising fabricating the metal washer from copper.

28. The method of claim 15 further comprising locating a bearing within the housing and supporting the rotating shaft with the bearing.

29. A ferrofluid seal suitable for sealing a magnetically-permeable rotating shaft passing from a first environment at a first pressure to a second environment at a second pressure higher than the first pressure, the seal comprising:

a housing having an attachment flange and a body;

a magnetically permeable annular pole piece;

a coolant channel located in the interior of the pole piece and means for conducting coolant through the coolant channel wherein the means comprises a coolant channel that passes through the attachment flange and into the pole piece;

means for forming a ferrofluid seal between the pole piece and the rotating shaft;

a first knife edge formed in the housing;

a second knife edge formed in the pole piece opposing the first knife edge;

a metal washer located between the first and second knife edges; and a third knife edge formed in the housing;

a fourth knife edge formed in the pole piece opposing the third knife edge;

a second metal washer located between the third and fourth knife edges;

a mechanism for applying a force between the housing and the pole piece to force the first and second knife edges into the metal washer and the third and four knife edges into the second metal washer thereby forming a hermetic seal.

* * * * *